June 8, 1943. G. L. HASSLER 2,321,293
APPARATUS FOR MEASURING PRESSURES IN CONTAINERS
Filed May 2, 1939 2 Sheets-Sheet 1
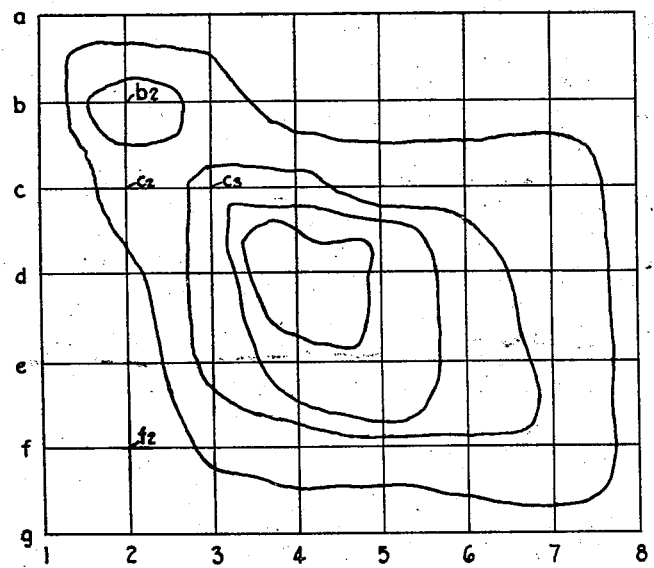
Fig. 1
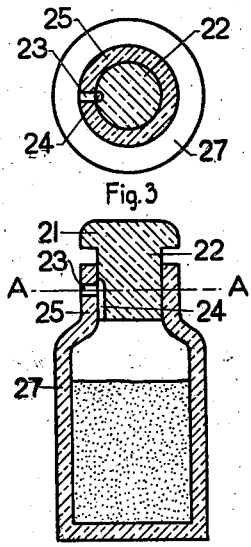
Fig. 3
Fig. 2
Fig. 4
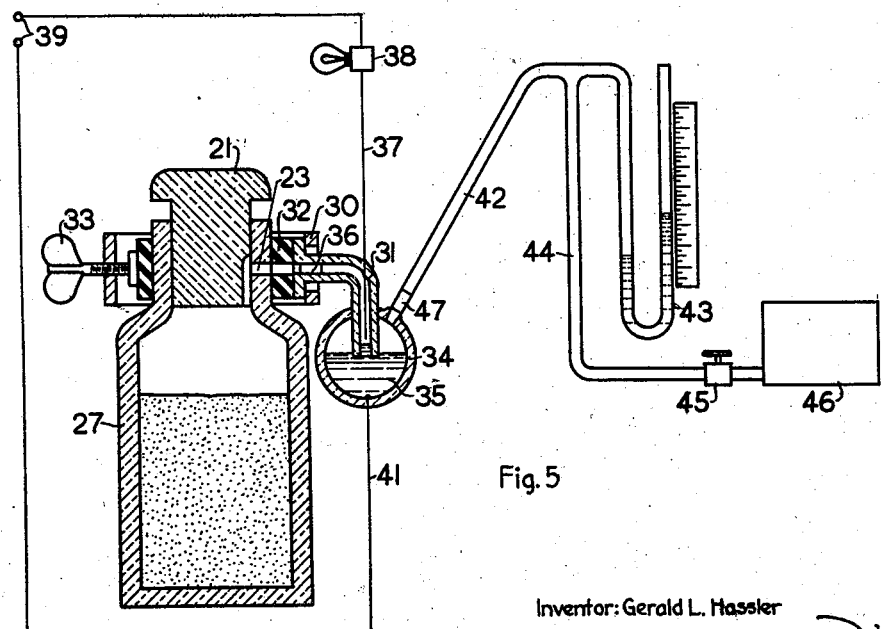
Fig. 5
Inventor: Gerald L. Hassler
By his Attorney Patented June 8, 1943

2,321,293

UNITED STATES PATENT OFFICE 2,321,293

APPARATUS FOR MEASURING PRESSURES IN CONTAINERS

Gerald L. Hassler, Berkeley, Calif., assignor to Shell Development Company, San Francisco, Calif., a corporation of Delaware Application May 2, 1939, Serial No. 271,287

2 Claims. (Cl. 177—311)

The present invention pertains to methods of soil exploration having for their purpose the detection of underground deposits of hydrocarbon matter.

In addition to standard geophysical methods of ground exploration, such as gravitational, seismic or electric methods, there has lately been developed and used a more direct method for detecting the presence of hydrocarbon deposits in the ground, which method consists in collecting at various locations samples of gases diffusing through earth strata and analyzing these samples for the presence therein of methane, or of hydrocarbons heavier than methane, or both, as disclosed, for example, in Patent No. 1,843,878 to Laubmeyer, or in my co-pending applications Serial Nos. 190,473 and 237,914, filed February 14, 1938, and October 31, 1938, respectively, now Patents 2,210,546 and 2,230,593, respectively.

This method presents, however, considerable difficulties in obtaining samples of soil gas not contaminated by atmospheric air, and in requiring an elaborate apparatus and an involved procedure for analysis, with the result that both the collecting and the analysis of the samples consume a considerable amount of time and slow down the exploration work, while the results obtained are not always reliable due, for example, to the contamination of samples obtained, or to defects in the analytical apparatus used.

It has now been found that another reason why the figures or indices obtained by means of soil gas survey may fail to give the true values of the actual concentrations of hydrocarbon matter, and more especially of methane, in gases diffusing through the soil at various localities, lies in the fact that said concentrations are to a certain degree affected by biochemical processes occurring in the soil.

It is known that various micro-organisms are encountered in the earth down to considerable depths, such, for example, as 17 meters and more, the density of population of such micro-organisms reaching considerable values, such, for example, as 3 million per gram of soil. However, most of the ordinary varieties of bacteria will be found in the top six inches of soil.

Although the common varieties of these micro-organisms are neutral in their behavior toward hydrocarbons, that is, do not assimilate or consume the latter, there exists many species of anaerobic bacteria, such as those known as *Bacillus aliphaticus*, *Bacillus aliphaticus liquifasciens*, *Bacillus paraffinus*, *Bacillus methanicus*, etc., which consume and/or fix hydrocarbons, and are therefore responsible for apparent decreases of hydrocarbon concentration in gas samples obtained from the soil, these bacteria living deeper than others.

Since, however, these bacteria subsist on hydrocarbons, and since it has now been found that their density of population in the soil at various localities is a direct function of the concentration of hydrocarbons available for their consumption, it is the object of the present invention to provide an exploration method whereby the relative concentrations of hydrocarbons in soil gases at various localities is determined by measuring the relative densities of population of hydrocarbon-consuming bacteria present in soil samples collected at these localities, and indications as to the location and approximate extent of hydrocarbon deposits in the ground are derived from the data obtained by such survey.

It is also an object of this invention to provide suitable apparatus for effecting the measurements necessary for this purpose, said apparatus being of simple construction and operation, to permit the exploration work to proceed at a comparatively very rapid rate.

These and other objects of the invention will be understood from the following description taken with reference to the attached drawings, wherein:

Fig. 1 is a diagrammatic contour map of a region surveyed by the present method;

Fig. 2 is a vertical cross-section view of a preferred form of a sample container;

Figs. 3 and 4 are horizontal cross-section views taken along line A—A of Fig. 2;

Fig. 5 is a diagrammatic view of a preferred embodiment of the analytical apparatus used according to the present invention;

Figure 6:
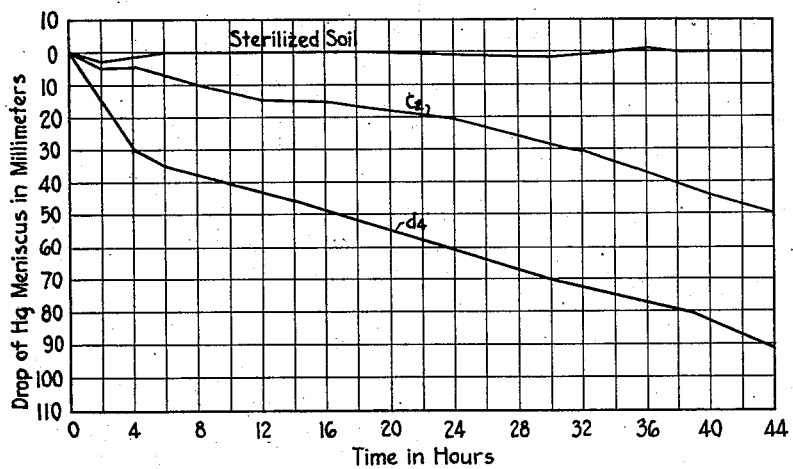
Fig. 6 is a graph giving various pressure-decrease curves drawn from data obtained by the present method.

Although the density of population of hydrocarbon-consuming bacteria in a given sample of soil may, according to the present invention, be determined by standard methods commonly used in bacteriology, these methods involve in general a complicated procedure requiring considerable time. It is, therefore, proposed to use for the purpose of this invention a more rapid method of analysis based on the following considerations.

The reaction according to which bacteria of the classes recited above consume hydrocarbons as a source of energy may be represented as follows:

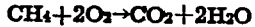

according to which three volumes of gas are converted to one volume. In addition to the above reaction, the bacteria fix some of the carbon, about one part in five, into the solid material of their bodies, so that in general their presence may be detected by placing a sample of soil in an atmosphere comprising one volume of gaseous hydrocarbons, such as natural gas, and two volumes of oxygen, for example, in a test tube closed by a liquid seal in a Mohr pipette, and observing the change in volume of the enclosed atmosphere, the consumption of the natural gas by the bacteria beginning immediately, and the data being recorded, for example, as cubic millimeters per hour per gram of soil.

It may be assumed that the rate of loss of volume of gas in the test tube is proportional to the initial population density of bacteria in the soil. Other classes of aerobic bacteria in the soil derive their energy and carbon from solid organic material, and typically consume one molecule of oxygen for every emitted molecule of carbon dioxide:

from which it follows that bacteria other than those which have been mentioned above and with which the present invention is concerned may be expected to cause only a second order change in the gas volume of the tube.

In some cases, however, it will be found that because of the presence of an excess of organic matter in the soil, the density of the non-diagnostic bacteria is such that their effects upon gas volume, as by the fixing of oxygen into the material of their bodies, will effectively mask the change in volume caused by the hydrocarbon-eating bacteria. It will then be advantageous to separate the bacteria from the organic matter by shaking all the samples of the soil with water for several minutes and then by light centrifuging or coarse filtering of each separate sample, to remove the water and bacteria from the soil and its attendant organic food. The test for volume changes may then be made upon the bacteria remaining with the water by the methods involving gas volume change described in this disclosure.

With the foregoing in mind, the following procedure may be followed in applying the method of the present invention.

If it is desired to survey a region or tract of land such as shown, for example, in Fig. 1, this may be effected by collecting samples either at stations $a_4$—$g_4$, spaced in a predetermined manner along a line 4, or at stations $d_1$—$d_5$ along any intersecting line $d$, or along both of these lines, or at any selected points such as $a_1$, $b_2$, $c_3$, etc., the whole tract being, if desired, subdivided into squares or any other divisions of suitable dimensions.

The samples of soil should be collected at a depth not less than 18 inches, and preferably deeper, since in this way a greater proportion of the surface living non-diagnostic bacteria may be eliminated, and may be placed in bottles such as shown in Figs. 2, 3 and 4. These bottles are provided with an orifice 23 in the neck 25, and with a gas-tight glass stopper 22 having a vertical slot 24 in its periphery, whereby the contents of the bottle may be either put in communication with the atmosphere, or cut off therefrom by turning the stopper, as shown in Figs. 3 and 4, respectively.

The bottles are filled with the soil samples to about three-quarters of their volume and are saturated with water, being further buffered to a constant but low alkalinity. The stoppers being then put into place, the contents of the bottles are subjected, through orifice 23 and slot 24 to a vacuum, such, for example, as one-third of atmospheric pressure, and are then exposed in the same manner to an atmosphere of natural gas, at normal or any other desired pressure. If desired, an atmosphere consisting of one particular hydrocarbon, such as methane or ethane, etc., or of any mixture of these or other desired hydrocarbons, may be substituted for the natural gas.

The bottles are then sealed by turning the stoppers, and are placed preferably in a water bath kept at a suitable constant temperature, such, for example, as room temperature, and are left therein for at least 12 hours to permit the gas within the bottle to come to a natural physical equilibrium with the soil sample, the water saturating said sample, and the glass of the bottle.

After such equilibrium has been reached during this initial period, the gas within each bottle is tested for any changes in its pressure.

An apparatus for effecting these pressure measurements repeatedly and with precision, but without appreciably affecting the pressure within the bottle, is shown in Fig. 5.

This apparatus comprises the bottle of Fig. 2, having its orifice 23 in communication with a short glass tube 31, an air-tight closure against the atmosphere being insured by means of a rubber gasket or seal 32 interposed and clamped between said orifice and said tube by means of a collar 30 fitted to the neck of the bottle and regulated by means of a screw 33. The passage inside the tube 31 has as small a volume as possible, and preferably contains a porous plug 36.

The lower end of tube 31 projects inside a glass container 34, and is preferably fused to the walls thereof. The inside of the container 34 is filled with an electrically conductive liquid or, preferably, mercury, a sufficient quantity being used to permit a certain amount of said mercury to enter within the lower portion of tube 31. A metallic conductor wire 37 is inserted, for example, by fusing, within the passage in tube 31, its length being selected so that the lower end of the wire is capable of contacting the mercury when said mercury reaches a certain level within tube 31. The wire 37 is connected to an electric indicating device, such as a small neon lamp 38, or any other suitable device, and to a source of electric current 39, the circuit comprising further a wire 41, which may be fused through a wall of the container 34 and thus held in contact with the body of mercury within said container.

The container 34 has also a suitable orifice for receiving, in air-tight fashion, a tube 42, whereby the inside of container 34 is in communication with one arm of a U-type manometer 43. The same arm of the manometer is also in communication through a tube 44 and a suitable microadjuster 45, with a source of positive or negative pressure 46, such as a gas or vacuum reservoir, a gas or vacuum pump, etc.

The pressure within the bottles 27 is measured by the above apparatus in the following manner:

With the tube 31 in register with the orifice 23, the glass stopper 21 is turned to put the gas within the bottle 27 in communication with the passage inside tube 31. Said passage being of an extremely small diameter and relatively short length, and the gas being prevented from expanding into receptacle 34 by the mercury within the lower portion of tube 31, this operation does not appreciably affect the pressure within bottle 27. The micro-adjuster 45 is then manipulated to regulate the gaseous pressure on the liquid surface within the receptacle 34 so as to cause the mercury meniscus within the tube 31 to contact the wire 37, thereby lighting the neon lamp 38. The greatest accuracy of measurement is ensured by effecting the barest contact between said wire and the mercury, whereby the neon lamp 38 is caused to give a twinkling effect. The reading of the manometer 43 is recorded at the moment when the lamp 38 begins to twinkle.

The bottle 27 is then disconnected and replaced in the bath, the pressure measurements being repeated at suitable intervals of time, such as every two, four, or more hours. If the soil within the bottle had been collected in a locality free of hydrocarbon-consuming bacteria, or if said soil, for example, had been sterilized by the application of heat, or by the use of bactericidal chemicals, such, for example, as $Hg(CN)_2$, the pressure within the bottle tends to remain substantially constant, as shown by the uppermost curve in Fig. 6.

If, however, the soil sample had been collected somewhere in the vicinity of a deposit of hydrocarbon matter, and contained therefore a certain concentration of bacteria capable of subsisting by consuming the hydrocarbon gases percolating through the ground from said deposit to the surface, the pressure within the soil-containing bottle will decrease with each subsequent measurement because of the progressing bio-chemical reaction involving a change of gas volume, as explained above, and smaller pressures from the gas reservoir 46 will be required with each subsequent test or reading to force the mercury meniscus within the tube 31 up into contact with the wire 37, which decreasing pressures may be observed and recorded by means of the manometer 43. Thus, for example, if a soil sample had been collected at a point $C_2$ (Fig. 1) on the flank of a hydrocarbon-bearing formation, the pressure within the bottle will decrease with time as indicated by the curve $c_2$ in Fig. 6.

A sample collected on the cap of a hydrocarbon-bearing formation, wherein more hydrocarbon gases diffuse through the ground, and the population density of the bacteria is therefore greater, will indicate an even greater pressure decrease, as shown by curve $d_4$ on Fig. 6.

By collecting the soil samples and determining the population density of the bacteria occurring therein, or relative values of such densities, as inferred from relative pressure decreases as described above, and suitably plotting the data obtained, a contour map, such as shown in Fig. 1, may be prepared, from which those skilled in the art may easily derive the desired inferences as to the location and extent of the hydrocarbon deposits.

The accuracy and the reliability of the present method may be easily checked by surveying the same tract by the soil-gas analysis method and the bacteriological analysis method, that is, by analyzing soil gases collected in the ground at certain points for the concentration therein of hydrocarbon gases, and then by analyzing soil samples collected at the same points to determine the population density of hydrocarbon-consuming bacteria in said soil samples. It will be seen that the variations in the data obtained by said two methods are always closely parallel to each other, this is, high and low hydrocarbon concentrations in soil gases correspond respectively to high and low bacteria population densities in soil samples, since a definite hydrocarbon concentration in soil gases is necessary to permit a certain bacteria pouulation density to subsist in the soil at a particular point.

Figure 7:
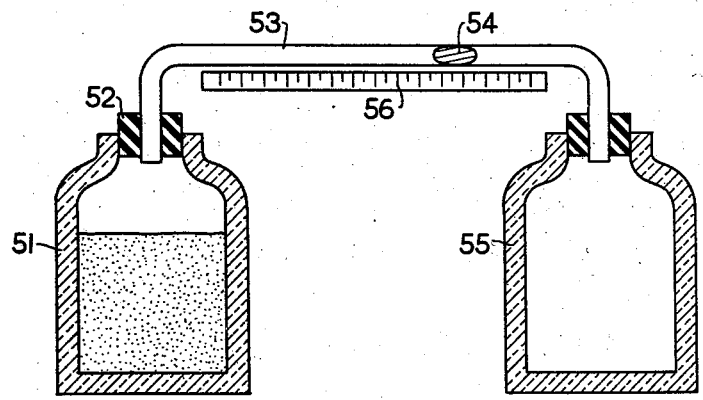
Fig. 7 is a diagrammatic view of another preferred embodiment of the apparatus used in practicing the present invention.

The present invention provides, therefore, an extremely efficient and rapid method for surveying tracts of land for the presence of hydrocarbon deposits by means of a bacteriological analysis of soil samples collected in said tract. It is understood, however, that the invention is not limited by the particular analysis method and apparatus described above, since any other methods and apparatus may be used for the same purpose. Thus, for example, the apparatus shown in Fig. 7 may be used instead of that shown in Fig. 5.

The sample of soil is placed as before in a test tube or bottle 51, closed by means of a stopper 52, and sealed against the atmosphere, if desired, with a suitable material such as beeswax or rosin. A glass tube 53, passing through stopper 52, extends into a bottle 55, which is sealed in a similar manner, but does not contain any soil sample, or contains a sterilized soil sample. A drop or bubble 54 of a suitable liquid, such as water, mercury, etc., is inserted within tube 53, thereby intercepting direct gaseous communication between bottles 51 and 55. The two bottles being then placed in a constant temperature bath, the consumption of the hydrocarbon atmosphere in bottle 51 by the bacteria results in a gradual pressure decrease occurring in said bottle, whereby the liquid bubble within tube 53 is caused to be displaced, and the rate of the pressure decrease in bottle 51 is determined by means of readings taken at suitable intervals on a scale 56, indicating the position of said bubble 54. It is obvious that if the gaseous mixture within bottle 51 is given at the beginning of this, a pressure equal to one atmosphere, the bottle 55 may be omitted, so that the tube 53 opens to the atmosphere, the gaseous volume within bottle 51 being, however, insulated therefrom by the liquid bubble 54. If the pressure within bottle 51 has at the beginning of the test a value higher than that of the atmosphere, the tube 53 may be disposed at an angle with the horizontal and may contain, instead of bubble 54, a relatively larger volume of a heavy liquid, such as mercury, to counterbalance said excess pressure. The arrangement shown in Fig. 7 has, however, the advantage of eliminating fluctuations due to barometric changes.

I claim as my invention:

1. For use in combination with a plurality of sealed gas containers each having a valved outlet, single means for consecutively measuring the pressure in said containers, said means comprising a tube of small volumetric capacity, fluid-tight clamping means for fixing one end of said tube in register with the valved outlet of one of said containers, a closed vessel partially filled with liquid sealed about the other end of said tube, said other end extending into said vessel below the surface of said liquid, a source of gaseous pressure, a conduit in communication between said source and the space above the liquid surface in said vessel, valve means in said conduit for applying a controlled gaseous pressure from said source to said vessel, whereby said liquid is caused to enter the tube immersed therein to a predetermined level, and manometer means connected to said conduit in parallel with said vessel for indicating the gaseous pressure applied thereto when the liquid reaches said level.

2. The apparatus of claim 1, comprising an electrical contact within the tube of small volumetric capacity extending into the sealed vessel, the liquid within said vessel being an electroconductive liquid, a source of electric current and an electric indicating device in electrical circuit with said contact and said liquid, said circuit being adapted to close when the level of the liquid within said tube reaches said contact.

GERALD L. HASSLER.